United States Patent [19]

Chen

[11] Patent Number: 4,670,986
[45] Date of Patent: Jun. 9, 1987

[54] SAW BLADE SUSPENSION DEVICE

[76] Inventor: Ruey-Zon Chen, 18, Lane 144, Tucheng Rd., Tali Hsiang, Taichung Hsien, Taiwan

[21] Appl. No.: 717,568

[22] Filed: Mar. 29, 1985

[51] Int. Cl.[4] ............................................. B27B 19/08
[52] U.S. Cl. ......................................... 30/392; 83/698
[58] Field of Search ........................ 30/392, 393, 394; 83/698; 279/83

[56] References Cited

U.S. PATENT DOCUMENTS

| | | | |
|---|---|---|---|
| 2,738,812 | 3/1965 | Waddell | 30/392 |
| 3,412,767 | 11/1968 | Green, Jr. | 30/392 |
| 4,020,555 | 5/1977 | Hedride | 30/392 |
| 4,351,112 | 9/1982 | Nalley | 30/392 |
| 4,441,255 | 4/1984 | Hoffmann | 30/392 |
| 4,528,753 | 7/1985 | Kuhlmann et al. | 30/392 |

Primary Examiner—E. R. Kazenske
Assistant Examiner—Willmon Fridie, Jr.
Attorney, Agent, or Firm—Leonard Bloom

[57] ABSTRACT

An improvement in saw blade suspension device is provided for use with a scroll-saw. By means of a pair of relatively hard washers positioned upon respective upper and lower support arms, and by means of a relatively hard pin, the applied force of and pressure resulting from use of the saw is concentrated on the hard steel washer and the pin. This structure permits the main body of the suspension device to be formed from a relatively soft material.

9 Claims, 10 Drawing Figures

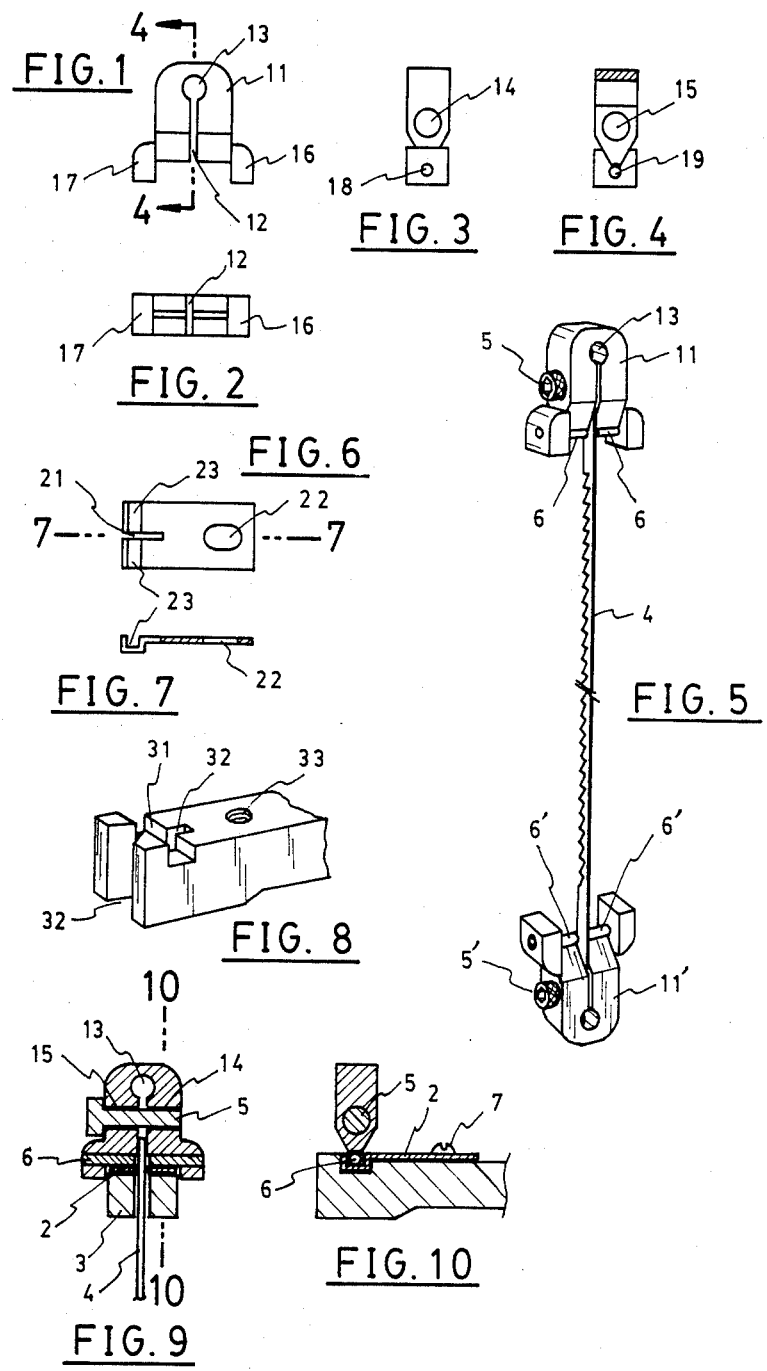

SAW BLADE SUSPENSION DEVICE

FIELD OF THE INVENTION

The present invention relates to a new improved saw blade suspension device. In particular, the present invention relates to a structure wherein the upper and lower ends of a saw blade are supported with a pin and a washer.

The present invention mainly provides saw-blade suspension device for scroll-saw or fret-saw.

BACKGROUND OF THE INVENTION

Conventional scroll sawing machine of the type utilizing a scroll-saw or fret-saw, in the process of pulling and sawing, can not provide suitable resilience. Accordingly, when the variation of the applied force on saw blade itself is overdone, the saw blade is easy to damage and break. Conventionally, the method resorted to in order to avoid damage or breakage have been to improve the quality of saw blade. However, this method increases the cost, and it also limits the type of work that can be performed with such a saw.

SUMMARY OF THE INVENTION

Accordingly, there is provided a non-fixed type of saw suspension device. This suspension device for a saw blade considers the position of the applied force and uses a relatively hard washer in combination with a relatively hard pin to prevent the deformation of the upper and lower support arms as well as the remainder of the device.

BRIEF DESCRIPTION OF THE DRAWINGS

FIG. 1 is front elevational view of the main body of the saw blade suspension device.

FIG. 2 is a bottom elevational view of the main body of the saw blade suspension device.

FIG. 3 is a side elevational view of the main body of the saw blade suspension device.

FIG. 4 is an exploded view taken along line 4—4, in FIG. 1

FIG. 5 is a perspective view of the saw blade suspension device and saw blade in combination.

FIG. 6 is a top elevational view of the washer.

FIG. 7 is an exploded view taken along line 7—7 of FIG. 6.

FIG. 8 is an perspective view of the upper support arm.

FIG. 9 is a vertically exploded view of the saw blade suspension device showing the washer, upper support arm and saw blade in combination.

FIG. 10 is a cross sectional view of the saw blade suspension device showing the washer, upper support arm and saw blade in combination.

GENERAL DESCRIPTION OF THE PREFERRED EMBODIMENT

Structure of the present invention mainly comprises main body 11, of the suspension device including the washer 2, upper and lower support arms 3 and saw blade 4.

As shown in FIGS. 1-4, the device includes a main body 11 having a slot 12 formed therein, one end of which terminates in a round hole 13. A pair of screw holes 14, and 15 are formed in the main body 11, said holes 14 and 15 being positioned on either side of slot 12, in substantially axial alignment to receive screws therein. Said screw hole 14 is threaded. Screw hole 15 is not threaded. When screw 5 (please refer to FIGS. 5 and 9) penetrates through round hole 15 to be locked in screw hole 14, the match of screw 5 and screw hole 14 will let the size of slot 12 lessen, and will let saw blade 4 placed in the slot 12 be tightly held. At the lower part of two sides of main body 11, there are respective retaining seats 16 and 17. On each of the retaining seats 16, 17, respectively, there is a hole 18, and respectively, the central line of two holes 18, 19 is a straight line. Above two holes 18, 19 respectively there is provided a steel wire (pin) 6 which penetrates through seats 16 and 17. The penetrated steel wire 6 is also positioned against the lower part of main body 11, the lower part of main body 11 being of a wedge shape. Due to the pull of saw blade pulled downward, and the downward force of main body 11 concentrates on steel wire 6, meaning that the downward pulling force is applied on a certain position.

The reason for using steel wire 6 to be applied by force, is that the material of main body 11 and upper and lower support arms 3 are relatively soft material of commonly constitutive steel and aluminum alloy etc. These parts are made by casting method, and it is easy to deform them because of their positioning which may expose them to force and pressure. Often, therefore, the inventor of the present invention uses rigid, anti-frictional material to design main body 11 and support arm 3 in order to be applied by force and get a durable and stable effect.

As shown in FIG. 5, the combination of a set of support structures and the saw blade 4, are seen. The two supporting structures are positioned mutually opposed to one another. Saw blade 4 is positioned between steel wires 6, 6 and steel wires 6', 6'. If the two main bodies 11, 11' are slightly deflective, the saw blade 4 also can be kept opposed and will not be deflective by the supporting force of circular steel wires 6, 6'.

A specially assembled washer 2 with substantially greater hardness than the main body 11 is placed between steel wire 6 and support arm 3 for keeping support arm 3 undamaged and undeformed. As shown in FIGS. 6, and 7, the constitution of washer 2 comprises a slot 21 for saw blade 4 to pass through, and a hole 22 is used for screw 7 to lock washer 2 on the support arm 3. A slot 23 is provided which is slightly larger than the diameter of steel wires 6, 6' and which is assembled to let steel wires 6, 6' slightly have movable space.

FIG. 8 is a perspective view of front end of support arm 3. Support arm 3 is same as conventional one, and there are two symmetrical arm bodies. At the front end of support arm 3, there is a slot 31 for slot 23 to be placed into. At the front end of support arm 3, there is a slot 32 for saw blade 4 to pass through. At the proper position of support arm 3, there is a screw hole 33 for screw 7 to lock washer 2 on the support arm 3. That is, washer 2 is tightly placed at the front end of support arm 3 in order to absorb the force transmitted from steel wires 6, 6'. Due to such match, the suspension structure of saw blade 4 can obtain very perfect consideration.

Due to the positioning of saw blade 4 between the two sections of steel wires 6, 6 and 6', 6' in a position in the middle of slot 23 of washer 2 and in a position in middle of slot 31 of support arm 3, positioned thusly, it is easy to get stable effect in the pulling and sawing process. Also, due to the suspension system of saw blade 4 being of the non-fixed type in the working process, force which applies on the saw blade 4 can be released, and naturally, it is therefore easier to use than the conventional suspension devices.

FIGS. 9 and 10 illustrate the condition of the mutual relationship of whole device. It is helpful to understand the present invention, as shown in these two figures and the condition of each constitutive element accepting the force in layer can be obviously seen.

Summing up, the present invention keeps the supporting force in alignment by a hard steel wire (i.e. using high carbon heated bearing steel) and a washer formed from a carbonate treated steel plate. In this fashion, the force being applied on the whole body of the present invention can obtain better result of the tool.

I claim:

1. A saw blade suspension device for a scroll saw, the scroll saw having a support arm, comprising a saw blade having a pair of end portions, means for supporting the saw blade at both end portions thereof, said means including a relatively-soft main body being substantially rectangular in shape, having a slot formed therein terminating in an enlarged opening for receiving a respective end of the saw blade, the main body further having a pair of spaced seats, one on each side of the slot, each of the seats having an opening formed therein, a relatively-hard pin received within each of the openings in the seats, said support arm being disposed rearwardly of the saw blade and transversely thereof, the support arm having a clearance slot therein for the saw blade and further having a substantially U-shaped transverse notch formed therein, a relatively-hard substantially flat washer secured to the support arm, the washer having a slot for the saw blade and further having a substantially U-shaped bent portion formed therein being substantially complementary to, and received within, the notch in the support arm, the pins being received within the bent portion of the washer, the main body being further formed with a pair of centrally positioned openings formed therein, one on each side of the slot, said openings being substantially axially aligned on a common axis, said common axis being substantially perpendicular to the slot in the main body, said openings including a smooth front section and a rear threaded section, and a screw received within the threaded rear section of the openings.

2. A saw blade suspension device for a scroll saw, the scroll saw having a support arm, comprising a saw blade having a pair of end portions, means for supporting the saw blade at both end portions thereof, said means including a relatively-soft main body having a slot formed therein for receiving a respective end of the saw blade, the main body further having a pair of spaced seats, one on each side of the slot, each of the seats having an opening formed therein, a relatively-hard pin received within each of the seats, said support arm being disposed rearwardly of the saw blade and transversely thereof, the support arm having a clearance slot therein for the saw blade and further having a transverse notch formed therein, a relatively-hard substantially flat washer secured to the support arm, the washer having a slot for the saw blade and further having a bent portion substantially complementary to, and received within, the notch in the support arm, thereby keying the washer to the support arm, and the pins being received within the bent portion of the washer.

3. The device of claim 2, wherein the main body is substantially rectangular in shape.

4. The device of claim 2, wherein the main body is further formed with a pair of centrally positioned openings formed therein, one on each side of the slot, said openings being substantially axially aligned on a common axis, said common axis being substantially perpendicular to the slot in the main body, and a screw received within the axially aligned openings in the main body.

5. The device of claim 4, wherein the openings in the main body include a front section and a rear section, the front section being smooth and the rear section having threads for receiving cooperating threads on the screw.

6. The device of claim 2, wherein each pin is comprised of steel.

7. The device of claim 2, wherein the washer is comprised of steel.

8. The device of claim 2, wherein the slot formed in the main body terminates in an enlarged opening.

9. The device of claim 2, wherein the transverse notch of the support arm is substantially U-shaped, and wherein the bent portion of the washer is substantially U-shaped, being substantially complementary to, and received within, the transverse notch of the support arm.

* * * * *